Aug. 2, 1949.                  C. C. BENTE                    2,478,080
                          LAWN MOWER SHARPENER
                          Filed Nov. 21, 1946
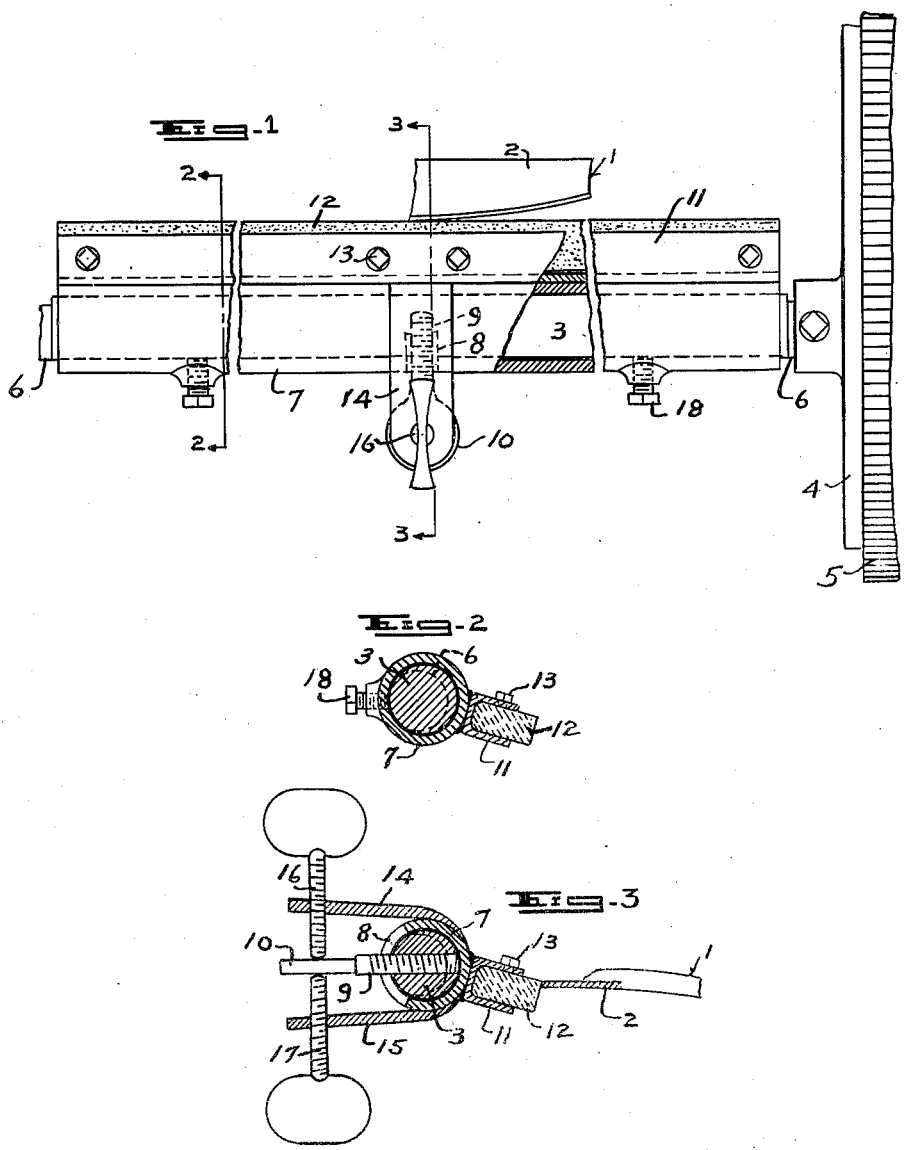
INVENTOR
CHRISTIAN C. BENTE
BY Jas R Snyder
ATTORNEY Patented Aug. 2, 1949

2,478,080

UNITED STATES PATENT OFFICE 2,478,080

LAWN-MOWER SHARPENER

Christian C. Bente, Heidelberg, Pa.

Application November 21, 1946, Serial No. 711,370

1 Claim. (Cl. 56—250)

This invention relates to a sharpener for a rotating cutting reel type of lawn-mower, and important objects and advantages thereof are to provide a sharpener of the character described, which will facilitate and expedite the sharpening of the blades of a lawn-mower, which will function to quickly sharpen the blades while the latter are being rotated by the propulsion of the mower in usual mowing operations or otherwise, which will uniformly sharpen the blades throughout their lengths and relatively to each other, which may be permanently carried by the mower without interfering with mowing operations, which may be readily installed on mowers already constructed as well as form a component part of a new mower structure, which is adjustable, simple in its construction and arrangement, durable and efficient in its use, and comparatively economical in its manufacture, installation, operation, and maintenance.

To the accomplishment of these and such other objects as may hereinafter appear, the invention resides in the novel construction, combination and arrangement of parts herein specifically described and illustrated in the accompanying drawing, but it is to be understood that changes in the form, proportions and details of construction may be resorted to that come within the scope of the claim hereunto appended.

In the drawing wherein like numerals of reference designate corresponding parts throughout the several views:

Figure 1 is a top plan view of a lawn-mower sharpener, constructed in accordance with the invention, and mounted in position on a lawn-mower.

Figure 2 is a transverse cross sectional view taken on line 2—2, Figure 1.

Figure 3 is a transverse cross sectional view taken on line 3—3, Figure 1.

The improved sharpener is designed and intended for use in connection with a rotating cutting reel type of lawn mower of the conventional construction. Such mower includes a rotating cutting reel 1 provided with a plurality of curved cutting blades 2, and further includes a horizontally extending frame shaft 3 disposed forwardly of the cylinder 1 and being rigidly connected with respective side plates 4, which support the wheels 5 of the lawn mower.

Referring in detail to the drawing, the invention comprises a supporting tube 7, which is adjustably mounted on and surrounds the frame shaft 3 and is of a length approximating the length of the latter. The central, forward side of the supporting tube is formed with a circumferentially extending slot 8 for the passage of a forwardly projecting, horizontally disposed screw 9, which latter is engaged in fixed position in the frame shaft, and carries an integral, flat, horizontally disposed adjusting head 10 at the forward free end thereof.

A channel bar 11 is permanently secured, by welding or in any other suitable manner, against the rearward side of the supporting tube 7 and extends throughout the length of the latter. The channel bar is disposed to decline at a slight angle with respect to the horizontal disposition of the screw 9 fixed in the frame shaft 3.

An abrasive element 12 is mounted in the channel bar 11 and projects beyond the free open side of the latter in the rearward direction, as shown in Figures 1 and 3. The abrasive element extends throughout the length of the channel bar and may be secured in the latter by means of set screws 13, or in any other suitable manner.

A pair of adjusting arms, respectively indicated at 14 and 15, are fixed to the supporting tube 7. The adjusting arms are preferably disposed in spread spaced relation to each other and project forwardly from the supporting tube at respective ends of the slot 8.

A pair of adjusting screws 16 and 17 are threadedly engaged and aligned in respective arms 14 and 15. The adjacent free ends of said adjusting screws engage respective faces of the interposed adjusting head 10, as clearly shown in Figure 3.

It will be obvious that by the adjustment of the screws 16 and 17 relatively to each other, the supporting tube 7 may be shifted in the rotating direction on the frame shaft 3 and thereby vary the angular disposition of the channel bar 11 and of the abrasive element 12. The supporting tube is secured in the adjusted position by means of set screws 18, which are threadedly mounted in the supporting tube and engage the frame shaft.

As stated, a considerable portion of the abrasive element 12 projects rearwardly from the channel bar 11. The adjusted sharpening position of the device on the mower is preferably such that the upper exposed corner of the abrasive element is disposed in the path of travel of the cutting edges of the blades 2, as shown in Figure 3, to frictionally contact with said cutting edges during the rotation of the cutting reel 1 in the forward or mowing direction.

It will here be noted that the frame shaft 3 has an eccentric connection 6 with the side plates 4 of the mower, so that said frame shaft may be adjusted in said side plates to vary the distance, if required, between the sharpener device and the cutting reel blades 2. However, under ordinary conditions, all necessary adjustments of the device may be conveniently effected by the adjustment of the screws 16 and 17 to vary the angular position of the abrasive element 12 in the manner stated.

In the use of the improved sharpener, the sharpening operation is effected by the rotation of the cutting reel 1 during the propulsion of the mower, or otherwise. Due to the usual curvature of the conventional cutting reel blades 2, the right end of each blade is disposed in advance of the left end thereof. Such contour of the blade will cause the right end cutting edge of the blade to initially contact with the right end of the abrasive element 12, after which the entire length of the cutting edge will be frictionally drawn in a somewhat diagonal direction across the entire length of the abrasive element, and thereby effect the sharpening operation.

Owing to the high rotating speed of the cutting reel 1 of a propelled mower, the sharpening operation is effected almost instantly. While the inherent resiliency of the cutting reel blades is very slight it is sufficient to cause the necessary repeated frictional contacts with the abrasive element to effect the sharpening operation, before said abrasive element becomes abraded to the extent of clearing the cutting edges of the rotating cutting reel blades.

After each sharpening operation it will be necessary to adjust the device for the next sharpening operation. Such adjustment is effected by changing the angle of the abrasive element by the adjustment of the screws 16 and 17 in the manner stated. As the average lawn mower need be sharpened only once or twice a season, adjustment requirements are correspondingly infrequent. The sharpening device may be carried continuously on the lawn mower, or may be removed from and replaced on the latter as required.

The present invention provides a most efficient device of its kind, which may be economically manufactured, and successfully employed for the purposes and in the manner herein set forth.

What I claim is:

In combination with a lawn mower including a frame shaft and a rotating cutting reel, of a supporting tube adjustably mounted on the frame shaft and approximating the length of the latter, a channel member fixedly secured at the rearward side of said tube and extending throughout the length of the latter and normally declining at a slight angle from the horizontal, an abrasive element secured in said member and extending throughout the length of said member, said tube being provided with a circumferentially extending slot at the forward side thereof, a pair of spaced arms fixed to said tube and projecting forwardly from respective ends of said slot, a horizontally disposed screw secured in the frame shaft and projecting forwardly through said slot and including a flat horizontally disposed head disposed between said pair of spaced arms, a pair of aligned adjusting screws threadedly engaged in respective arms and engaging said head and being operable to adjust said tube on the frame shaft to vary the position of said element to shift the latter in the path of travel of the cutting edges of the blades, and means carried by said tube and engaging the frame shaft for securing said tube in the adjusted position on the frame shaft.

CHRISTIAN C. BENTE.

REFERENCES CITED

The following references are of record in the file of this patent:

UNITED STATES PATENTS

| Number | Name | Date |
|---|---|---|
| 617,584 | Leshure | Jan. 10, 1899 |
| 977,363 | Barber et al. | Nov. 29, 1910 |
| 1,130,624 | Onsel | Mar. 2, 1915 |

FOREIGN PATENTS

| Number | Country | Date |
|---|---|---|
| 7,446 | Great Britain | June 21, 1898 |